US009756463B2

(12) United States Patent
Sambongi et al.

(10) Patent No.: US 9,756,463 B2
(45) Date of Patent: Sep. 5, 2017

(54) ELECTRONIC DEVICE WHICH MODIFIES A BOUNDARY OF A TIME ZONE USED TO SET A CURRENT DATE AND TIME, AND METHOD AND NON-TRANSITORY RECORDING MEDIUM THEREOF

(71) Applicant: CASIO COMPUTER CO., LTD., Shibuya-ku, Tokyo (JP)

(72) Inventors: Masao Sambongi, Hachioji (JP); Masatoshi Watanuki, Sagamihara (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/795,701

(22) Filed: Jul. 9, 2015

(65) Prior Publication Data
US 2016/0021501 A1    Jan. 21, 2016

(30) Foreign Application Priority Data

Jul. 18, 2014   (JP) .................................. 2014-147827

(51) Int. Cl.
*H04W 4/02*     (2009.01)
*H04L 7/00*     (2006.01)
(Continued)

(52) U.S. Cl.
CPC ............ *H04W 4/021* (2013.01); *G04R 20/06* (2013.01); *G04R 20/08* (2013.01); *H04L 7/0008* (2013.01)

(58) Field of Classification Search
CPC ........ H04L 7/0008; G04R 20/06; G04R 20/08
See application file for complete search history.

(56) References Cited

U.S. PATENT DOCUMENTS 4,513,378 A * 4/1985 Antkowiak ............ G01C 21/12
                                                               342/389
5,477,458 A * 12/1995 Loomis .................. G01S 19/04
                                                  342/357.48
(Continued)

FOREIGN PATENT DOCUMENTS

JP     2000512389 A    9/2000
JP     2008051697 A    3/2008
(Continued)

OTHER PUBLICATIONS

Lecture 36, Module 5, "Geographical data in computer" Introduction to Modern Surveying Techniques, NPTEL and IIT Kanpur, available from Dec. 31, 2009 at http://nptel.ac.in/courses/105104100/lectureE_36/E_36_5.htm.*

(Continued)

*Primary Examiner* — Vladimir Magloire
*Assistant Examiner* — David Orange
(74) *Attorney, Agent, or Firm* — Holtz, Holtz & Volek PC

(57) ABSTRACT

A timer unit to counts a current date and time, a current position acquisition unit to acquire a current position, a determination unit to determine a time zone in which the acquired current position is included, and a local time acquisition unit to calculate local time corresponding to a time difference of the time zone determined by the determination unit are included. When a boundary line of the time zone is along a coastline, the determination unit changes the boundary line from the coastline to a side of a sea in a predetermined distance range and determines a time zone.

12 Claims, 9 Drawing Sheets

(51) Int. Cl.
    *G04R 20/06*    (2013.01)
    *G04R 20/08*    (2013.01)

(56) References Cited

U.S. PATENT DOCUMENTS

| | | |
|---|---|---|
| 5,982,710 A | 11/1999 | Rawat et al. |
| 7,965,937 B2 | 6/2011 | Nishikawa et al. |
| 2010/0228948 A1 | 9/2010 | Jaekwan |

FOREIGN PATENT DOCUMENTS

| | | |
|---|---|---|
| JP | 2010151644 A | 7/2010 |
| JP | 2010210276 A | 9/2010 |

OTHER PUBLICATIONS

J. Capon, "A probabilistic model for run-length coding of pictures," in IRE Transactions on Information Theory, vol. 5, No. 4, pp. 157-163, Dec. 1959. URL: http://ieeexplore.ieee.org/stamp/stamp.jsp?tp=&arnumber=1057512&isnumber=22775.*

Japanese Office Action (and English translation thereof) dated Apr. 26, 2016, issued in counterpart Japanese Application No. 2014-147827.

* cited by examiner

| SECTION SETTING VALUE | TIME ZONE | SUMMER TIME UTILIZATION RULE | STANDARD RADIO WAVE RECEPTION AREA |
|---|---|---|---|
| 01 | 00 | 00 | 01 |
| 02 | 00 | 01 | 01 |
| 03 | 00 | 02 | 00 |
| 04 | 01 | 03 | 02 |
| 05 | 01 | 04 | 02 |
| 06 | 01 | 05 | 00 |
| : | : | : | : |
| fe | 5c | de | 00 |
| ff | 5c | df | 00 |

FIG. 4A

| TIME ZONE SETTING VALUE | TIME DIFFERENCE |
|---|---|
| 00 | +0:00 |
| 01 | +0:15 |
| 02 | +0:30 |
| 03 | +0:45 |
| 04 | +1:00 |
| 05 | +1:15 |
| ⋮ | ⋮ |
| 5e | −11:30 |
| 5f | −11:45 |

FIG. 4B

| SUMMER TIME UTILIZATION RULE SETTING VALUE | START | END | SHIFT TIME |
|---|---|---|---|
| 00 | N/A | N/A | 0 |
| 01 | AT ONE ON LAST SUNDAY IN MARCH | AT ONE ON LAST SUNDAY IN OCTOBER | +1:00 |
| 02 | AT TWO ON SECOND SUNDAY IN MARCH | AT TWO ON FIRST SUNDAY IN NOVEMBER | +1:00 |
| 03 | AT TWO ON FIRST SUNDAY IN APRIL | AT TWO ON LAST SUNDAY IN OCTOBER | +1:00 |
| 04 | AT TWO ON FIRST SUNDAY IN OCTOBER | AT TWO ON FIRST SUNDAY IN APRIL | +1:00 |
| 05 | AT TWO ON THIRD SUNDAY IN OCTOBER | AT TWO ON THIRD SUNDAY IN FEBRUARY | +1:00 |
| ⋮ | ⋮ | ⋮ | ⋮ |
| 1e | AT TWO ON LAST SUNDAY IN SEPTEMBER | AT TWO ON FIRST SUNDAY IN APRIL | +1:00 |

FIG. 4C

| RECEPTION AREA SETTING VALUE | TRANSMISSION STATION | FREQUENCY |
|---|---|---|
| 00 | N/A | — |
| 01 | MSF | 60.0 |
| 02 | DCF77 | 77.5 |
| 03 | JJY40 | 40.0 |
| 04 | JJY60 | 60.0 |
| 05 | WWVB | 60.0 | und
ELECTRONIC DEVICE WHICH MODIFIES A BOUNDARY OF A TIME ZONE USED TO SET A CURRENT DATE AND TIME, AND METHOD AND NON-TRANSITORY RECORDING MEDIUM THEREOF

BACKGROUND OF THE INVENTION

An embodiment of the present invention relates to an electronic device, a date and time setting method, and a recording medium with which it is possible to set a date and time according to positioning data.

For example, in a Japanese Patent Application Laid-Open No. 2010-151644, the following technique is disclosed. That is, in a case of setting a time zone based on positional information transmitted from a GPS satellite, a margin is provided around an acquired current position and it is determined more accurately whether movement into a different time zone is performed not according to one point but according to distribution of time zones in a range of the margin.

In a case where a boundary line (coastline) between land and a sea and a boundary between time zones are the same as each other, since it is usually considered that an electronic device is used by a user in a time zone on a side of the land around the coastline, there may be a problem in actual usage by the user when a local time is calculated and displayed in a time zone on a side of the sea according to a map during usage by the user at a coast or in an adjacent sea.

An embodiment of the present invention is an electronic device, a date and time setting method, and a recording medium which can improve user-friendliness of when local time is acquired around a seacoast.

SUMMARY OF THE INVENTION

In order to achieve the above purpose, an embodiment of the present invention is an electronic device including: a timer unit configured to count current date and time; a current position acquisition unit configured to acquire a current position; a determination unit configured to determine a time zone in which the acquired current position is included; and a local time acquisition unit configured to calculate local time corresponding to a time difference of the time zone determined by the determination unit, wherein when a boundary line of the time zone is along a coastline, the determination unit changes the boundary line to a side of a sea in a predetermined distance range from the coastline and determines a time zone.

BRIEF DESCRIPTION OF THE DRAWINGS

FIGS. 4A to 4C are tables for describing contents examples of pieces of setting data;

DETAILED DESCRIPTION

In the following, an embodiment of the present invention will be described with reference to the drawings.

Figure 1:
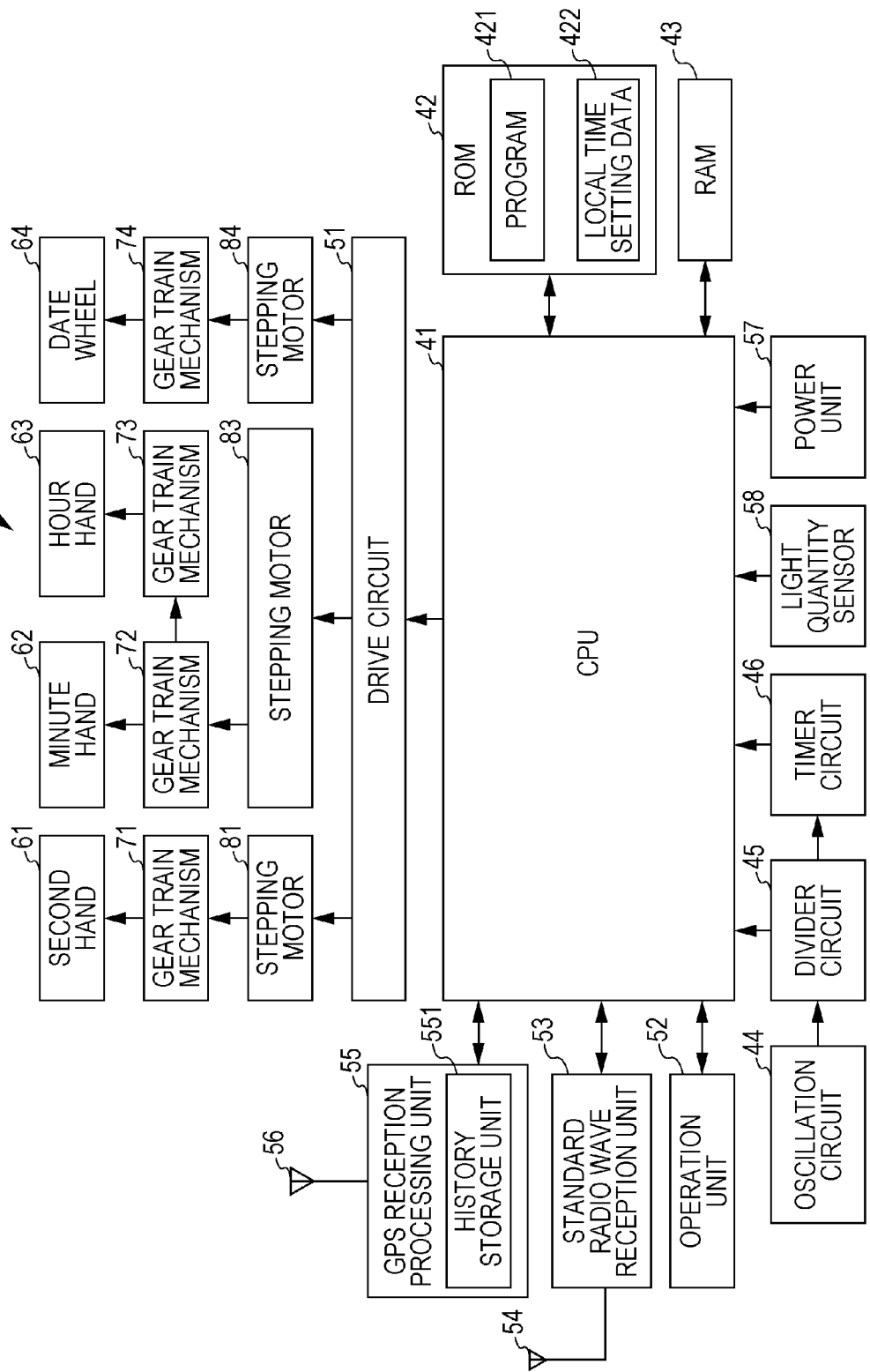
FIG. 1 is a block diagram illustrating a functional configuration of an electronic clock which is an embodiment of an electronic device of the present invention.

FIG. 1 is a block diagram illustrating a functional configuration of an electronic clock 1 which is an embodiment of an electronic device of the present invention.

The electronic clock 1 is not specifically limited but is an analog electronic clock to display a date and time by using an indicator. For example, the electronic clock 1 includes a central processing unit (CPU) 41 (determination unit, local time acquisition unit, date and time information acquisition unit, and correction unit), a read only memory (ROM) 42 (storage unit), a random access memory (RAM) 43, an oscillation circuit 44, a divider circuit 45, a timer circuit 46 (timer unit), a drive circuit 51, an operation unit 52, a standard radio wave reception unit 53 (radio wave reception unit) and an antenna 54 thereof, a GPS reception processing unit 55 (current position acquisition unit) and an antenna 56 thereof, a power unit 57, a light quantity sensor 58, a second hand 61 and a gear train mechanism 71 related to a rotation thereof, a minute hand 62 and a gear train mechanism 72 related to a rotation thereof, an hour hand 63 and a gear train mechanism 73 related to a rotation thereof, a date wheel 64 and a gear train mechanism 74 related to a rotation thereof, and stepping motors 81, 83, and 84 to respectively operate the gear train mechanisms 71 to 74.

The CPU 41 performs various kinds of calculation processing and performs integrated control of a whole operation of the electronic clock 1. The CPU 41 controls an operation of an indicator and performs various kinds of displaying with the indicator. Also, the CPU 41 calculates date and time by operating the standard radio wave reception unit 53 and acquiring reception data or acquires date and time information by operating the GPS reception processing unit 55. Also, the CPU 41 corrects date and time, which is counted by the timer circuit 46, based on the acquired date and time information or calculates local time by determining a time zone according to the date and time counted by the timer circuit 46 and a current position.

The ROM 42 stores a program 421 for various kinds of control executed by the CPU 41 or setting data. In the program 421, for example, a local time setting program to perform setting related to local time based on information of a current position or the like, or a date-and-time correction program to correct a date and time counted by the timer circuit 46 are included. In the setting data, local time setting data 422 (local time setting information) for calculation of local time corresponding to a current position is included. Contents of local time setting data will be described later.

The RAM 43 provides a work memory space to the CPU 41 and temporarily stores data. In the RAM 43, data related to section setting, a history of date and time correction, a positioning result, a set time zone, and summer time, data indicating an indicator position, and the like are also stored.

The oscillation circuit 44 generates and outputs a predetermined frequency signal. The oscillation circuit 44 includes, for example, a crystal oscillator.

The divider circuit 45 divides the frequency signal, which is output from the oscillation circuit 44, into a signal of a frequency used by the CPU 41 or the timer circuit 46. The output frequency may be configured in a manner changeable by a control signal from the CPU 41.

By counting a divider signal input from the divider circuit 45 and adding the signal to an initial value indicating a predetermined date and time, the timer circuit 46 counts a current date and time. The date and time counted by the timer circuit 46 can be corrected by a control signal from the CPU 41.

The operation unit 52 receives input operation from a user. In the operation unit 52, for example, a push-button switch or a winding crown is included. Operation in which the push-button switch is pushed or in which the winding crown is pulled out and rotated is detected and an electric signal corresponding to an operation type is output to the CPU 41.

The standard radio wave reception unit 53 receives a radio wave in a long-wavelength (LF) band by using the antenna 54. By the standard radio wave reception unit 53, a time signal output (TCO) of an amplitude-modulated standard radio wave is demodulated and output to the CPU 41. A tuning frequency to a radio wave in a long-wavelength band by the standard radio wave reception unit 53 is adjusted, by control from the CPU 41, according to a transmission frequency from a standard radio wave transmission station which is an object of reception. Also, in the standard radio wave reception unit 53, various kinds of processing for improving receiving sensitivity are performed. An analog signal is digitalized at a predetermined sampling frequency and is output to the CPU 41.

The GPS reception processing unit 55 receives a radio wave in an L1 band (1.57542 GHz) by using the antenna 56 and deciphers a signal (navigation message data) by demodulating and decoding a spectrum-spread transmission radio wave from a positioning satellite. Here, the positioning satellite is a GPS satellite. Also, the GPS reception processing unit 55 calculates a current date and time or a current position based on a result of the decipher. Contents of a deciphered signal are output to the CPU 41 in a predetermined format. Operation control related to the reception, decipher, and output is performed by a control unit (microcomputer) provided in the GPS reception processing unit 55. Configurations which respectively perform operations related to the demodulation, decoding, decipher, and control in the GPS reception processing unit 55 are integrally formed as a module on a single chip and are connected to the CPU 41. On/off control of an operation of the GPS reception processing unit 55 is performed by the CPU 41 independently from an operation of each of different parts of the electronic clock 1. When an operation of the GPS reception processing unit 55 is off, power supply to the GPS reception processing unit 55 is stopped to save power. Also, in the GPS reception processing unit 55, a history storage unit 551 is provided. Received or acquired date and time information, positional information, and predicted orbit data are stored for a predetermined of time and/or for a predetermined amount.

The power unit 57 supplies power for an operation in each part in a predetermined voltage. The power unit 57 includes a battery. The battery includes, for example, a solar battery and a secondary battery. Alternatively, as the battery, a replaceable button battery may be used.

For example, the light quantity sensor 58 is provided in a parallel manner on a dial plate provided on a surface of the electronic clock 1 and measures a quantity of light emitted from the outside. As the light quantity sensor 58, for example, a photodiode is used. The light quantity sensor 58 outputs an electric signal (voltage signal or current signal) corresponding to an incident light quantity. The electric signal is digital-sampled by an analog/digital converter (ADC) (not illustrated) and is input into the CPU 41. Alternatively, in a case where a solar battery is used as the power unit 57, an incident light quantity may be measured based on power-generation electromotive force of the solar battery.

The second hand 61, the minute hand 62, the hour hand 63, and the date wheel 64 (one or whole of these may be also referred to as indicator) are indicators respectively indicating, a second, a minute, an hour and a date in a case of displaying a date and time. Here, each of the second hand 61, the minute hand 62, and the hour hand 63 is a needle-shaped indicator a rotation axis of which is around a center of a dial plate provided on a surface (display surface) of the electronic clock 1 and indicates time, various function types, or a state by pointing a scale or a mark provided on the dial plate. The date wheel 64 is a rolling disk or a toric member provided, in parallel with the dial plate, on a rear surface (on rear side of display surface) of the dial plate. Marks indicating dates are provided at equal intervals on a circumference of a surface facing the dial plate and any one of the marks is exposed from an opening part provided in the dial plate, whereby date is indicated.

The gear train mechanism 71 is a gear train to transfer a rotation of a predetermined angle (here, 6°) to the second hand 61 each time the stepping motor 81 is rotationally driven. The gear train mechanism 72 transfers a rotation of a predetermined angle (here, 1°) to the minute hand 62 each time the stepping motor 83 is rotationally driven. The gear train mechanism 73 is rotated along with a rotation of the gear train mechanism 72 and transfers a rotation which is 1/12 of the rotation of the minute hand 62 to the hour hand 63. That is, each time the minute hand 62 rotates for 360°, the hour hand 63 rotates for 30°. While the hour hand 63 rotates for 360°, the minute hand 62 makes a circle for twelve times on the dial plate. The gear train mechanism 74 transfers a rotation of a predetermined angle to the date wheel 64 each time the stepping motor 84 is rotationally driven. For example, the date wheel 64 is rotationally moved for 360/31° by a rotational operation in 1440 steps and a mark exposed from an opening part is changed for one day.

In each of the stepping motors 81, 83, and 84, a rotor rotates for a predetermined angle with respect to a stator according to a drive pulse input by the drive circuit 51. As described above, rotations of the rotors are respectively transferred to the gear train mechanisms 71 to 74.

The drive circuit 51 outputs a drive pulse of a predetermined voltage to the stepping motors 81, 83, and 84 according to a control signal from the CPU 41. The drive circuit 51 can change a length (pulse width) of the drive pulse according to a state or the like of the electronic clock 1. Also, when a control signal to drive a plurality of indicators simultaneously is input, the drive circuit 51 reduces a peak of a load by performing outputs while slightly shifting output timing of the drive pulse.

Next, setting of a time zone in the electronic clock 1 of the present embodiment will be described.

Figures 2, 3:
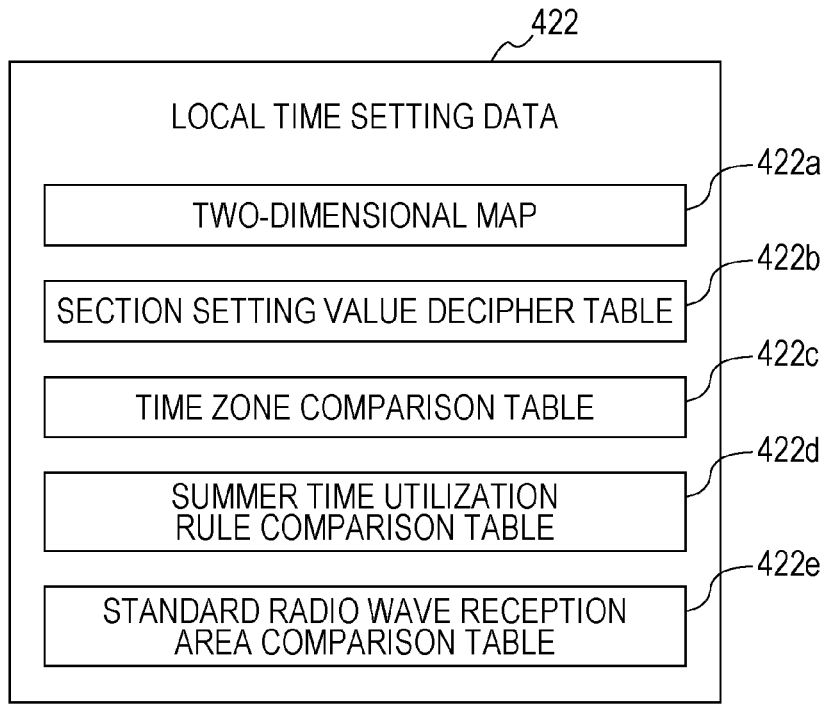
FIG. 2 is a view illustrating a configuration of setting data according to calculation of local time.
FIG. 3 is a table for describing a contents example of each piece of setting data.

FIG. 2 is a view for describing setting data related to the setting of a time zone.

Also, each of FIG. 3 to FIG. 4C is a table illustrating a contents example of each piece of setting data.

In the local time setting data 422 of the ROM 42, a two-dimensional map 422a, a section setting value decipher table 422b, a time zone comparison table 422c, a summer time utilization rule comparison table 422d, and a standard radio wave reception area comparison table 422e are included. In the electronic clock 1 of the present embodiment, a time zone to which the acquired current position belongs is determined by using the local time setting data 422.

The two-dimensional map 422a is world map data in which a plurality of sections L having a predetermined size is arrayed in a two-dimensional matrix. A method of setting the sections L will be described later. A section setting value having one byte (eight bit) is set for each section L. By the section setting value, a time zone, a summer time utilization rule, and information (standard radio wave information) related to a type of a standard radio wave included in a reception area (reception range) of the section are acquired.

The section setting value decipher table 422b holds table data to acquire a time zone setting value, a summer time utilization rule setting value, and a standard radio wave reception area setting value from a section setting value.

FIG. 3 is a table illustrating a contents example of the section setting value decipher table 422b.

A section setting value indicated by one byte indicates a combination of a time zone in which the section is included, a summer time utilization rule, and a type of a standard radio wave including the section in a reception area. Each of the time zone setting value, the summer time utilization rule setting value, and the standard radio wave reception area setting value is indicated by a value of one byte (here, in hex display). In such a manner, since a section setting value of one byte is acquired, information of three bytes is acquired as a whole.

As illustrated in FIG. 4A, in the time zone comparison table 422c, a time difference (TZ) from coordinated universal time (UTC) is set with respect to each time zone setting value. Here, a time difference from +12 hours to −11 hours and 45 minutes can be acquired at 15 minutes intervals. However, a time difference which is not currently used is not necessarily set as a time zone setting value and may be arbitrarily omitted.

As illustrated in FIG. 4B, in the summer time utilization rule comparison table 422d, summer time utilization information such as start timing and end timing of summer time, and shift time (ST) is set with respect to each piece of summer time utilization rule setting value. Alternatively, a summer time period setting value indicating a combination of start timing and end timing of summer time may be further determined separately and set with respect to each summer time utilization rule setting value. By a summer time period comparison table (not illustrated), a summer time period setting value may be converted into an actual summer time period when acquired.

The shift time (ST) indicates a shift amount from standard time during utilization of summer time. As the shift time, "0" is stored when summer time is not utilized and a signed value other than "0" is stored when the summer time is utilized.

As illustrated in FIG. 4C, in the standard radio wave reception area comparison table 422e, with respect to each standard radio wave reception area setting value, a type of a transmission station of a standard radio wave including the section in a reception area and a transmission frequency of the standard radio wave are associated and stored. In a transmission station of a standard radio wave set and stored here, MSF in the UK, DCF77 in Germany, and two kinds of transmission stations JJY40 and JJY60 according to JJY (registered trademark) in Japan, and WWVB in the US are included. Here, as illustrated in FIG. 3, even in a section where a plurality of standard radio waves can be actually received, setting is performed selectively as a reception area of one kind of standard radio wave. However, setting as a reception area of a plurality of standard radio wave transmission stations may be performed in parallel.

In such a manner, in the electronic clock 1, first, a section corresponding to a current position is identified by using the two-dimensional map 422a and a section setting value corresponding to the section is acquired. Then, by using the section setting value decipher table 422b, a time zone setting value, a summer time utilization rule setting value, and a standard radio wave reception area setting value are acquired from the acquired section setting value. Moreover, with reference to the time zone comparison table 422c, the summer time utilization rule comparison table 422d, and the standard radio wave reception area comparison table 422e, a time difference, a summer time utilization rule, and reception area information of a standard radio wave are acquired from each setting value.

Here, a method of setting the sections L will be described.

Figure 5:
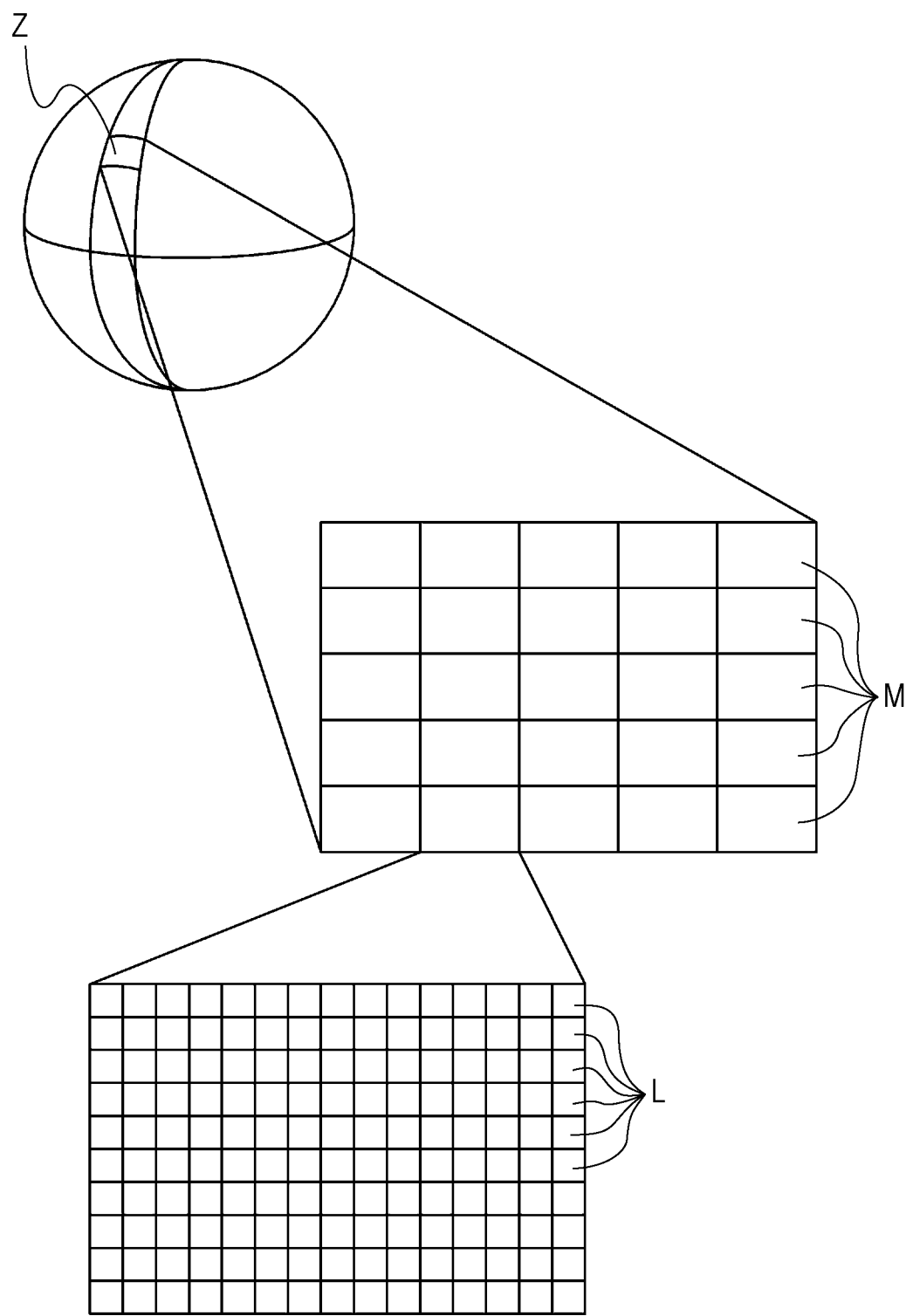
FIG. 5 is a view for describing a setting method of a section.

FIG. 5 is a view for describing a method of setting the sections L.

In the electronic clock 1 of the present embodiment, the two-dimensional map 422a is divided into a plurality of map data files. These map data files are generated for each predetermined region (hereinafter, referred to as zone Z) set in a unit of predetermined latitude/longitude. When a value of latitude/longitude of a current position is acquired, it can be determined in which map data file the current position is included. For example, when it is assumed that a size of each zone Z is in a range of 10° in a latitude direction and 15° in a longitude direction, the two-dimensional map 422a is divided into 432 map data files.

A size of each of the map data files is compressed and only a map data file corresponding to a current position is decompressed and read in the RAM 43, whereby storage capacity or memory capacity is decreased. A data compression method in a file will be described later.

A zone Z corresponding to each map data file is further divided into a plurality of sub-regions (hereinafter, referred to as mesh M). In each mesh M, sections L the number of which is previously-determined for each zone Z are included. Each of the meshes M is a rectangular region including the sections the number of which is determined and which is arrayed in a matrix in the latitude direction and the longitude direction. The map data file is compressed with the mesh M as a unit. Pieces of data of the compressed meshes in the same zone Z are arrayed in predetermined order and stored in the ROM 42. A size of each mesh M is set in each map data file in such a manner that compression efficiency becomes high. Alternatively, sizes of all the meshes M may be identical to each other on the two-dimensional map 422a.

FIGS. 6A to 6D are views for describing compression of map data.

Figures 6A, 6B, 6C, 6D:
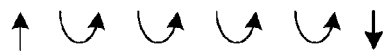
FIGS. 6A to 6D are views for describing a compression method of map data.

In the electronic clock 1 of the present embodiment, data of each mesh M is compressed by run-length compression. The run-length compression is a compression method of performing encoding, in a case where a certain data value is successive, in which the data value and the number of times of succession are described. For example, as illustrated in FIG. 6A, when section setting values "1" to "3" arranged in a 10×10 two-dimensional matrix are arrayed in order in an arrow direction in a zigzag manner from a lower left section to an upper left section, 49 section setting values "2" are successively arrayed first and three section setting values "3" are successively arrayed. Then, finally, 20 section setting values "1" are successively arrayed. As illustrated in FIG. 6B, by describing the above-described encoded data next to a header (here, "F2" indicating format 2) indicating array order of sections, encoded and compressed data of each mesh M is generated. Then, by further arraying the encoded and compressed data in order with respect to a plurality of meshes M included in one zone Z, one map data file is generated.

In such a manner, a compression ratio of compression data of each of mesh M is improved as the number of successive sections with the same section setting value becomes greater. Thus, array order of sections can be set in a direction in which more sections with the same section setting value are successive.

As illustrated in FIG. 6C, as indicated by an arrow, in a mesh M where there are many section setting values successively arrayed in a vertical direction in a two-dimensional matrix, compression in array order started from a lower left part and ended in a lower right part is the most effective. Then, as illustrated in FIG. 6D, compression-encoded data next to a header "F3" indicating a format 3 is generated. The array direction may be a diagonal direction or in a spiral shape other than a vertical/horizontal direction.

Here, in a case where the zone Z is separated according to latitude/longitude, a distance between longitude intervals becomes shorter at higher latitude. Thus, by setting a section L according to the distance, separation in which the number of sections L in a zone Z is different depending on latitude can be performed. By such separation, a length in a longitude direction of each section L can be kept substantially even and the number of sections L can be set in an effective manner according to the length. As a length in the longitude direction, for example, a length around 500 m is preferably set.

On the other hand, since the sections L are also set based on a width of latitude/longitude, the zone Z can be divided into the same number of sections L regardless of the latitude. In this case, a length in the longitude direction becomes shorter in a section L at higher latitude. That is, resolution is decreased in a section L at lower latitude. Thus, it is possible to set a length of each section L, which is at the low latitude, as around 500 m in order to keep necessary space resolution even at low latitude. Setting of a size of each section L may be performed, for example, by a diagram method of the two-dimensional map 422a. In such an array, the number of arrays becomes, for example, 43200 in the latitude direction and 86400 in the longitude direction. Note that in a case of performing such setting with latitude/longitude as a reference, a polar region such as the Antarctic Continent may be set separately in a different table.

Next, setting of a time zone in the electronic clock 1 of the present embodiment will be described.

In many cases, on the land, a time zone is set in a predetermined administrative unit such as a country or a state and a boundary line is provided along an administrative boundary. On the other hand, in the sea with no island or the like, a boundary line of a time zone is provided simply along a longitude line. As a result of such boundary setting, in a case where a part of land of one administrative unit is protruded to longitude corresponding to an adjoining time zone, when a time zone is integrally provided with respect to the land in the administrative unit, a boundary line of the time zone may be generated along a coastline. In such a case, in the electronic clock 1, a position of a boundary line of a time zone along a coastline is changed to a position away from the coastline to a side of the sea for a predetermined distance.

Figure 7:
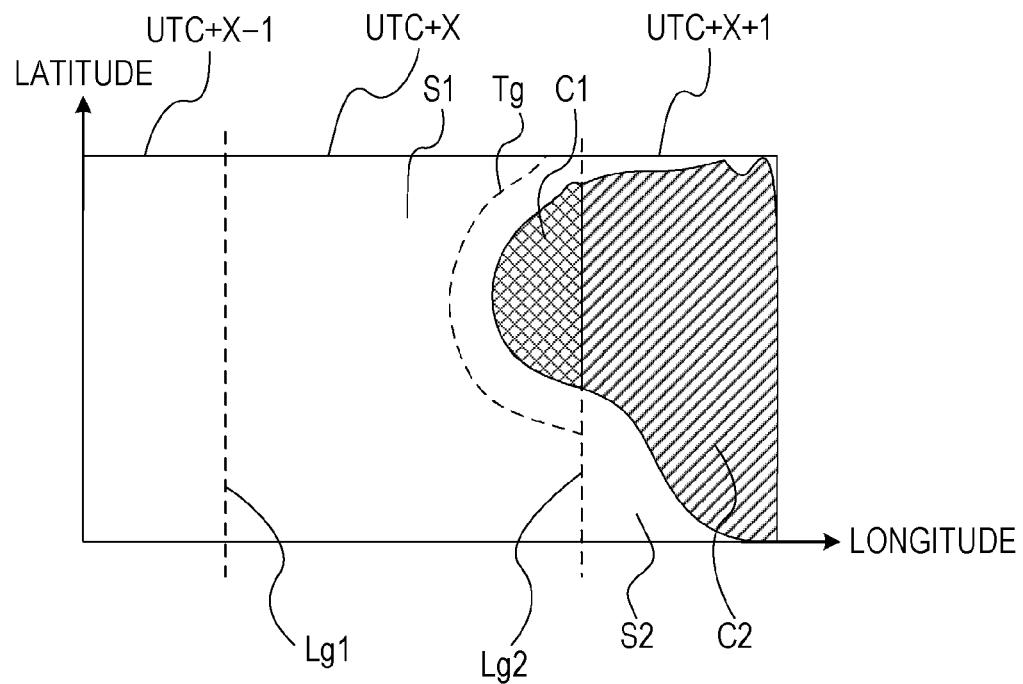
FIG. 7 is a view for describing setting of a boundary of a time zone.

FIG. 7 is a view schematically describing setting of a boundary of a time zone in the two-dimensional map 422a. Here, in a two-dimensional plane indicated by a predetermined latitude/longitude range, a hatched region (land C1 and C2) indicates the land and the other region (ocean S1 and S2) indicates the ocean. With longitude lines Lg1 and Lg2 which are boundary lines of time zones in the ocean, here, it is assumed that there are the following regions from the left. That is, there are a region in which a time difference from the UTC date and time is (X−1) hours and local time is (UTC+X−1), a region in which a time difference is X hours and local time is (UTC+X), and a region in which a time difference is (X+1) hours and local time is (UTC+X+1).

Here, the most of the land (land C2) is in a range of the local time (UTC+X+1) and a part of the land C1 is protruded to a range of the local time (UTC+X). When such land C1 and land C2 are in the same administrative unit, a time zone of the protruded land C1 is often set identical with a time zone of the land C2. On the other hand, when the ocean S1 and ocean S2 are respectively set, according to the longitude line Lg2, in the range of the local time (UTC+X) and the range of the local time (UTC+X+1), a coastline which is a boundary of the land C1 and the ocean S1 becomes a boundary line of time zones.

In the electronic clock 1 of the present embodiment, with respect to each section included in the land in the two-dimensional map 422a, a boundary line is set as usual in such a manner as to match with a time zone determined for each predetermined administrative unit such as a country or a state to which the section belongs. Also, a predetermined time zone, which is determined by a boundary line set according to a latitude line or a longitude line, is set with respect to each section included in the ocean. In many cases, in the ocean, a boundary line in a longitude direction of a time zone is set at every 15° of longitude. That is, in the example in FIG. 7, in a part where the longitude lines Lg1 and Lg2 are on the sea, boundary of time zones are generally set in such a manner as to overlap with the longitude lines Lg1 and Lg2.

On the other hand, when a boundary of time zones is a coastline, that is, at a boundary of the land C1 and the ocean S1, a boundary line Tg is changed to a position away from the coastline to a side of the sea for a predetermined distance and a time zone is set. Here, the predetermined distance can be 12 nautical miles (about 20 km) which is a territorial sea of each country. Thus, in the two-dimensional map 422a, a section included in a territorial sea along a coastline of land which belongs to a certain administrative unit and time zone is set in such a manner as to belong to the time zone.

Figure 8:
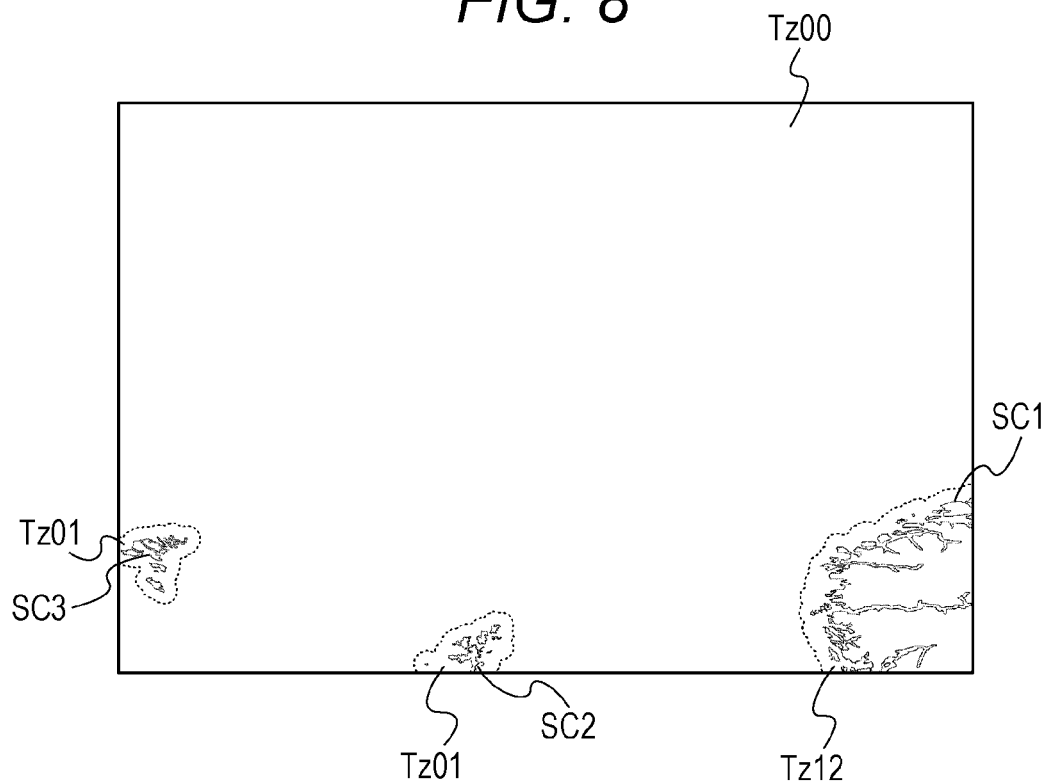
FIG. 8 is a view illustrating an example of map data.

FIG. 8 is a view illustrating an example of map data in which a boundary of a time zone is set.

Here, a range of longitude of 7.5° west to 7.5° east and latitude of 60° to 70° north, that is, a zone from around a coastline SC1 (solid line in south east part) including Bergen and Sogne Fjord in a south west part of Norway to the Faeroe Islands SC3 (west end) in the two-dimensional map 422a is illustrated. It is determined that Norway as an administrative unit belongs to a time zone of "UTC+1". On the other hand, it is determined that the ocean adjacent to the coastline of Norway belongs to a time zone of "UTC (±0)". Thus, the coastline is a boundary of time zones.

Also, the Shetland Islands SC2 in a north part of Scotland and the Faeroe Islands SC3 are in the time zone of "UTC (±0)" and time is forwarded for an hour in summer due to utilization of summer time.

In the electronic clock 1, with respect to each section included in the land of Norway, "UTC+1" is set as a time zone TZ12. Also, in the ocean, each section between the boundary line Tg, which is an outer edge of a territorial sea and which is indicated by a broken line, and a coastline is set to be in the time zone TZ12 of "UTC+1" which zone is determined by Norway. In the time zone TZ12 illustrated here, summer time is utilized. Also, the Shetland Islands SC2, the Faeroe Islands SC1, and each section included in a range of 12 nautical miles offshore from these islands are set to be in the time zone TZ01 of "UTC (±0)", summer time being utilized therein in summer. On the other hand, each section included in the ocean which does not belong to any territorial sea is set on the assumption that the section belongs to a time zone TZ00 of "UTC (±0)." In a range of the time zone TZ00, summer time is not utilized.

Here, the boundary line Tg of 12 nautical miles of a territorial sea is 12 nautical miles away from any point of a coastline and does not necessarily correspond to an undulating coastline. Also, the outside of 12 nautical miles of the territorial sea is generally high seas and the boundary line Tg is not necessarily determined in a strict manner for a display. Thus, the boundary line Tg of time zones, which line is between the territorial sea and the ocean outside of the territorial sea in the two-dimensional map 422a, can include a straight line, polygonal line, or smooth curved line, which is placed in a distance of around 12 nautical miles (predetermined distance range) from the coastline, instead of a shape copied from a shape of the coastline.

Next, an operation of setting and calculating local time in the electronic clock 1 will be described.

Figure 9:
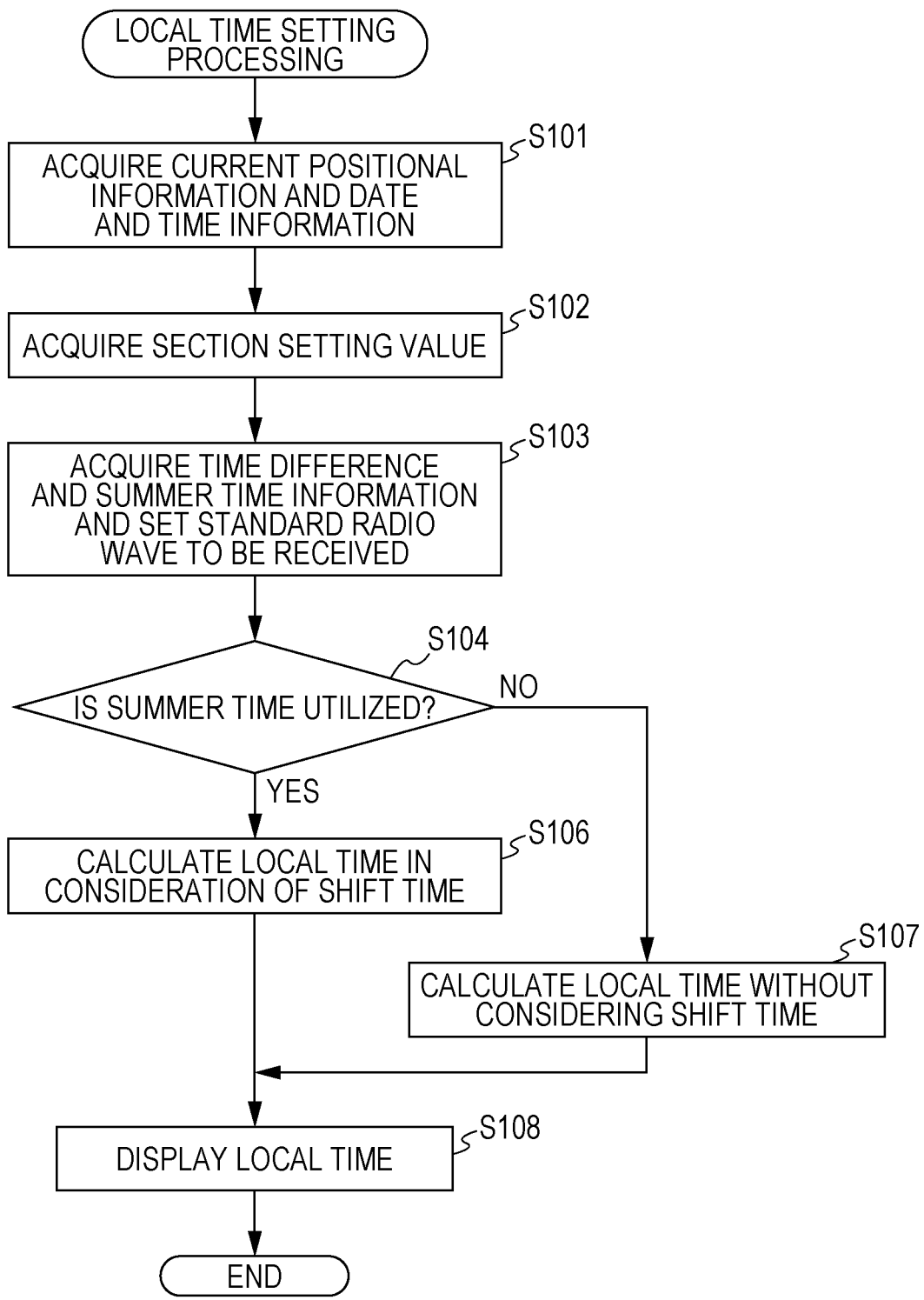
FIG. 9 is a flowchart illustrating a control procedure of local time setting processing.

FIG. 9 is a flowchart illustrating a control procedure of local time setting processing executed by the CPU 41 in the electronic clock 1 of the present embodiment.

The local time setting processing is executed, for example, according to input operation of a positioning operation command into the operation unit 52 by a user.

When the local time setting processing is started, the CPU 41 operates the GPS reception processing unit 55, makes a control unit (microcomputer) of the GPS reception processing unit 55 to start radio wave reception from a positioning satellite such as a GPS satellite, and acquires current positional information and date and time information calculated in the GPS reception processing unit 55 (step S101). When being calculated in the GPS reception processing unit 55 according to a positioning operation performed by the GPS reception processing unit 55, positional information is acquired from the GPS reception processing unit 55. When the positioning operation is not performed by the GPS reception processing unit 55 or when the positioning operation is failed and positional information is not acquired, positional information corresponding to a city which is set as a current position at that time in the electronic clock 1 and which is stored in the RAM 43 is acquired.

The CPU 41 identifies a section, to which a current position indicated by acquired positional information belongs, and acquires a section setting value set with respect to the section (step S102). More specifically, according to latitude/longitude of a current position indicated by the acquired positional information, the CPU 41 specifies a map data file (zone Z) in which the current position is included. Then, the CPU 41 specifies, in the specified map data file, a mesh M in which the current position is included. The CPU 41 specifies a compression format of the mesh M with reference to a header assigned to encoded data related to the specified mesh M and specifies array order of sections in the mesh M. Then, the CPU 41 acquires a section setting value set in a section to which the current position belongs.

Based on the acquired section setting value, the CPU 41 acquires a time difference and summer time information in the section and performs acquisition setting of a standard radio wave transmission station which an object of reception (step S103). More specifically, first, the CPU 41 refers to the section setting value decipher table 422b and acquires a time zone setting value, a summer time utilization rule setting value, and a reception object standard radio wave reception area setting value corresponding to the section setting value acquired in step S102. Then, the CPU 41 refers to the time zone comparison table 422c and acquires a time difference corresponding to the acquired time zone setting value. Also, the CPU 41 refers to the summer time utilization rule comparison table 422d and acquires a summer time period and shift time corresponding to the acquired summer time information. Then, the CPU 41 refers to the standard radio wave reception area comparison table 422e and acquires standard radio wave information corresponding to the acquired standard radio wave reception area setting value. The CPU 41 stores the acquired time difference, summer time, shift time, and standard radio wave information into the RAM 43.

Then, based on the summer time period acquired in step S103, the CPU 41 determines whether summer time is utilized (step S104). When it is determined that the summer time is utilized ("YES" in step S104), the CPU 41 calculates local time based on the time difference (TZ), the summer time, and the shift time (ST) which are acquired in step S103 and the coordinated universal time (UTC) acquired in step S101 (step S106). That is, in consideration of shift time due to utilization of the summer time, local time (LT) in a section to which a current position belongs is calculated by LT=UTC+TZ+ST.

When it is determined in step S104 that the summer time is not utilized ("NO" in step S104), the CPU 41 calculates local time based on the time difference (TZ) acquired in the processing in step S103 and the coordinated universal time (UTC) acquired in step S101 (step S107). That is, since the summer time is not utilized, shift time is not considered. Thus, local time (LT) in a section to which a current position belongs is calculated by LT=UTC+TZ.

When local time is calculated in the processing in step S106 or step S107, the CPU 41 corrects, by using the acquired local time, a date and time counted by the timer circuit 46, operates the drive circuit 51 or the like, and displays the calculated local time with an indicator (step S108). When the local time is displayed, the CPU 41 ends the local time setting operation.

Next, a date and time correction operation in the electronic clock 1 will be described.

In the electronic clock 1, date and time information is acquired by using a standard radio wave or a reception radio wave from a GPS satellite and date-and-time correction processing to correct a date and time counted by the timer circuit 46 is performed based on the acquired date and time information. The date-and-time correction processing is started when a quantity of light measured at a predetermined frequency such as once a day at predetermined time or measured by the light quantity sensor 58 becomes equal to or higher than a predetermined reference level for the first time in a day. As the predetermined time, for example, 00:00:10 is set as execution time of first date-and-time correction processing of the day. When acquisition of date and time information is not successful at the execution time of the first date-and-time correction processing, reception of a standard radio wave may be repeatedly performed every one hour by 05:00:10 until acquisition of the date and time information becomes successful. Also, as a predetermined reference level according to a detected light quantity, for example, a light quantity which is measured when irradiation with sunlight is performed in daytime outside of a building is set.

In a case of only acquiring date and time information from the GPS satellite, only a part of a radio wave from one satellite which part includes date and time information is received. That is, orbit information necessary for positioning is not received, whereby reception time (such as two to ten second) and power consumption can be reduced. In this case, a distance from a current position to the one satellite is not determined Thus, for example, by correcting propagation delay time based on an average distance, an adequately-accurate date and time (around several msec) can be acquired.

Figure 10:
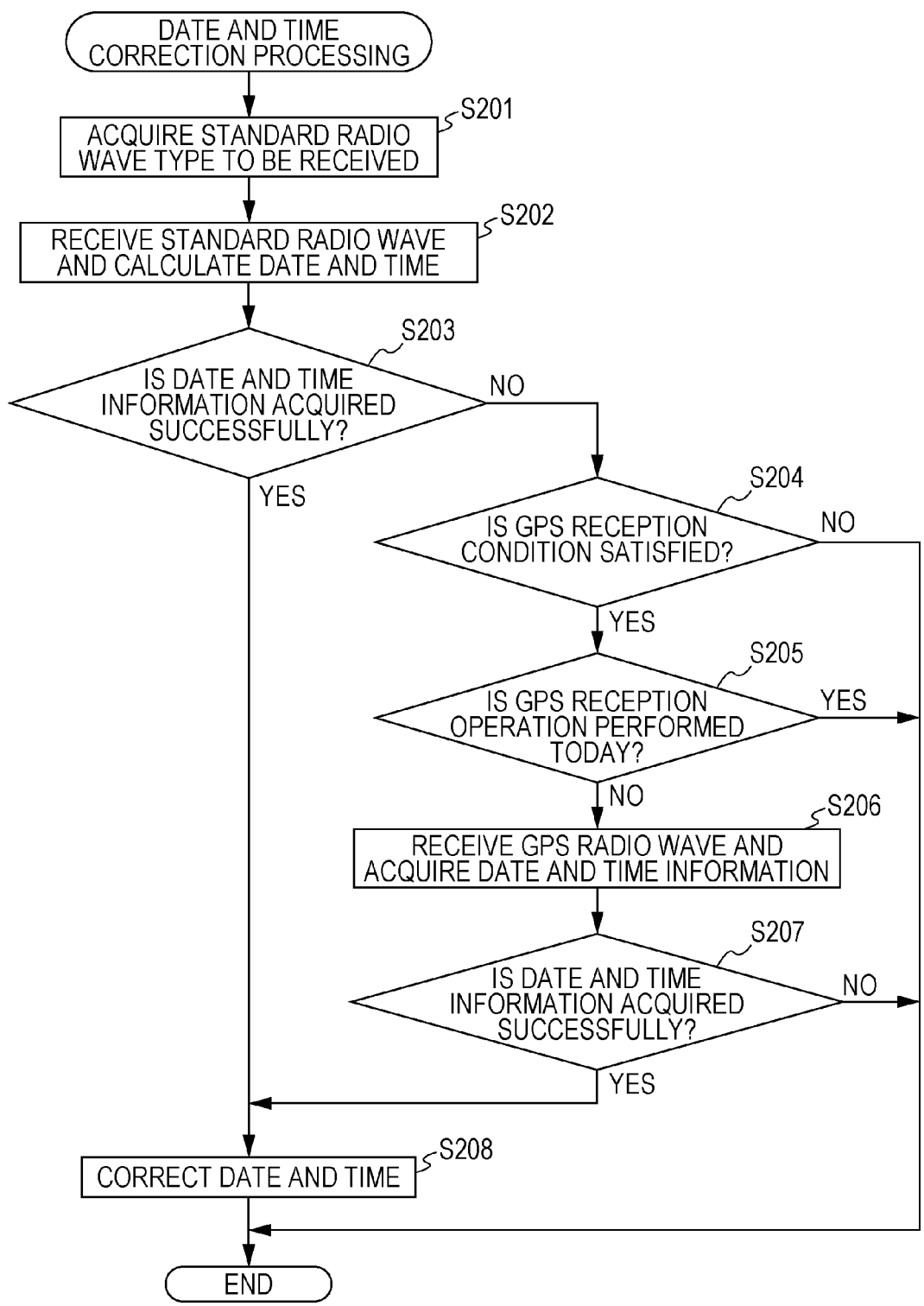
FIG. 10 is a flowchart illustrating a control procedure of date-and-time correction processing.

FIG. 10 is a flowchart illustrating a control procedure of the date-and-time correction processing executed by the CPU 41 in the electronic clock 1.

When the date-and-time correction processing is started, the CPU 41 first acquires standard radio wave information which is acquired in step S103 of the local time setting processing and stored in the RAM 43, that is, a type of a standard radio wave including, as a reception area, a section to which a current position belongs (step S201).

The CPU 41 makes the standard radio wave reception unit 53 receive and demodulate a standard radio wave at a tuning frequency corresponding to the acquired type of the standard radio wave. Also, decoding is performed according to a format of a TCO of the standard radio wave to acquire the date and time information (step S202). The CPU 41 determines whether acquisition of the date and time information according to the standard radio wave is successful (step S203). When it is determined that the acquisition of the date and time information is successful ("YES" in step S203), the CPU 41 makes the processing transition to step S208.

When it is determined that the acquisition of the date and time information according to the standard radio wave is not successful ("NO" in step S203), the CPU 41 determines whether a radio wave reception condition from the GPS satellite is satisfied (step S204). When it is determined that a predetermined condition is not satisfied ("NO" in step S204), the CPU 41 ends the date-and-time correction processing.

When it is determined that the radio wave reception condition is satisfied ("YES" in step S204), the CPU 41 determines whether radio wave reception from the GPS satellite is tried to be performed today (step S205). In this case, a reception history may be held in the GPS reception processing unit 55 or may be stored in the RAM 43. When it is determined that the radio wave reception is already tried ("YES" in step S205), the CPU 41 ends the date-and-time correction processing.

When it is determined that the radio wave reception from the GPS satellite is not tried ("NO" in step S205), the CPU 41 operates the GPS reception processing unit 55 to receive a radio wave from the GPS satellite and tries to acquire date and time information (step S206). The CPU 41 determines whether radio wave reception from the GPS satellite is successively performed by the GPS reception processing unit 55 and whether normal date and time information is input from the GPS reception processing unit 55 into the CPU 41 (step S207). When it is determined that the radio wave reception is not successively performed ("NO" in step S207), the CPU 41 ends the date-and-time correction processing.

When it is determined that the date and time information is successively acquired ("YES" in step S207) or when it is determined in step S203 that date and time information is successively acquired according to the standard radio wave ("YES" in step S203), the CPU 41 corrects a date and time, which is counted by the timer circuit 46, based on the acquired date and time information and ends the date-and-time correction processing.

Modification Example

Next, a modification example of the local time setting processing in the electronic clock 1 will be described.

In the above-described embodiment, when a boundary of a time zone is a coastline, a boundary line is set at a position away from the coastline to a side of the sea for 12 nautical miles and the time zone is determined. However, a distance from the coastline is not limited to 12 nautical miles.

For example, a distance from a coastline can be set at a position 200 nautical miles (about 370 km) away from a seacoast which is a boundary of an exclusive economic zone (EEZ). By this setting, it is possible to set a land side of a coastline which belongs to a certain administrative unit and an EEZ of a country according to the administrative unit on the land side to be in the same time zone. Accordingly, for example, an electronic clock 1 used by a user in a ship which sails from a port in a certain administrative unit displays a date and time in a time zone corresponding to the administrative unit while the ship sails in an EEZ according to the administrative unit, and thus, it is convenient to the user.

On the other hand, in a case of a ship which temporarily enters an EEZ from the ocean (high seas) outside of the EEZ and sails (pass), it is convenient for a user to keep using local time in a time zone on the high seas without applying a time zone of an administrative unit corresponding to an EEZ set with respect to each section in the EEZ.

Thus, in the present modification, setting of a time zone is changed not only based on existence in an EEZ but also on a history of an entrance route into the EEZ.

With respect to each section setting value in a section setting value decipher table 422*b* in the electronic clock 1, a flag indicating an exclusive economic zone is associated and stored in addition to a time zone setting value, a summer time utilization rule setting value, and a standard radio wave reception area setting value. Here, in a section included in an exclusive economic zone claimed by an administrative unit, an exclusive economic zone flag is set as "1." In a section included in the ocean outside of the exclusive economic zone or in land, an exclusive economic zone flag is set as "0." Alternatively, the exclusive economic zone flag may be set separately from a section setting value in such a manner as to correspond to each section.

Also, in setting of a positioning result, a time zone, and the like stored in the RAM 43, a value of a collectively-acquired exclusive economic zone flag is included.

Figure 11:
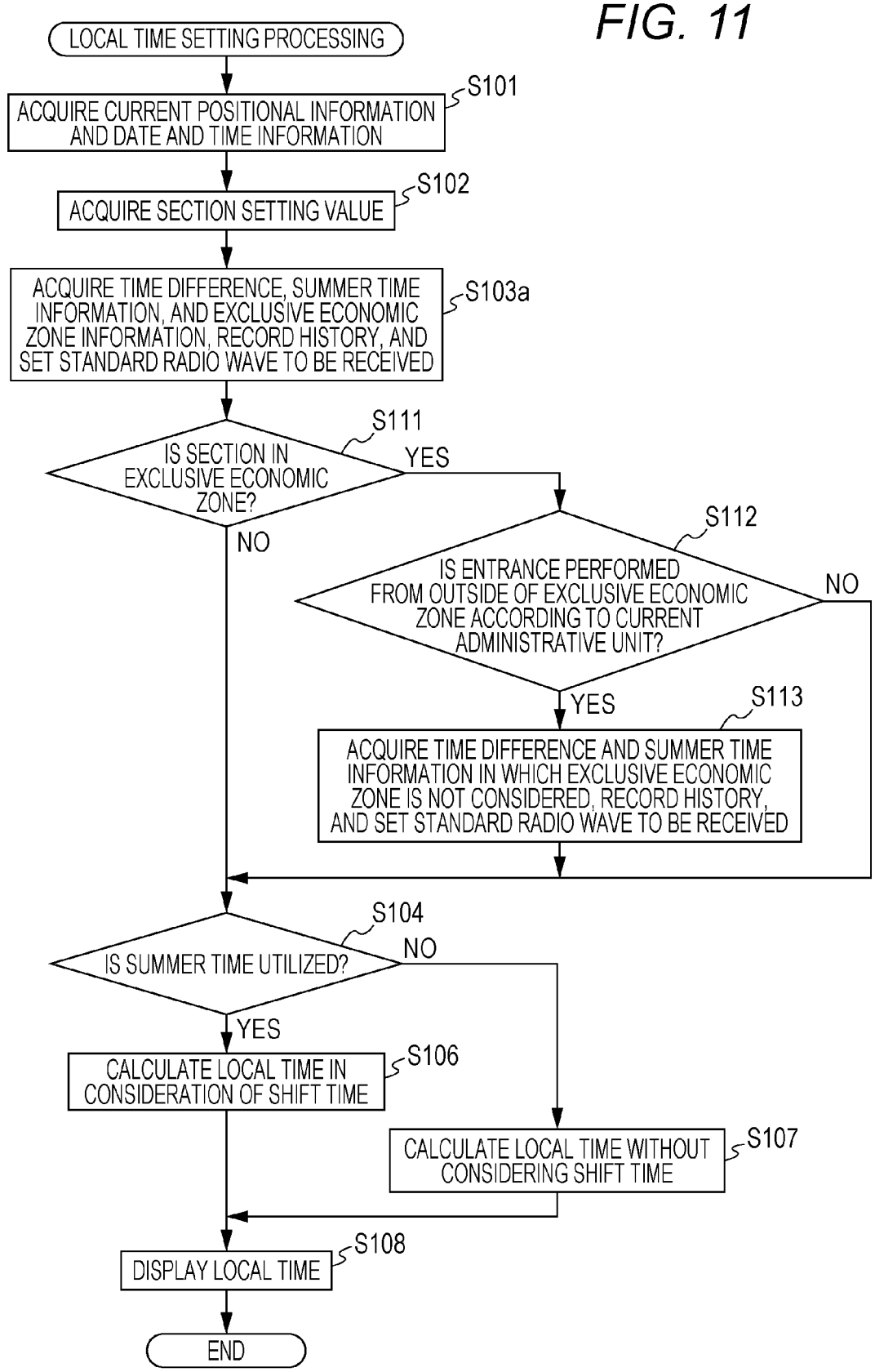
FIG. 11 is a flowchart illustrating a control procedure of a modification example of local time setting processing.

FIG. 11 is a flowchart illustrating a control procedure of local time setting processing executed by a CPU 41 in the electronic clock 1 of the present modification example. The local time setting processing of the modification example is processing in which processing in steps S111 to S113 is added to the local time setting processing in the embodiment illustrated in FIG. 9 and in which the processing in step S103 is replaced with processing in step S103*a*. The other processing is identical to the local time setting processing in the embodiment illustrated in FIG. 9, and thus, the same reference sign is used with respect to the identical processing and a detail description thereof is omitted.

When a section setting value is acquired in processing in step S102, the CPU 41 refers to the section setting value decipher table 422b, acquires a time difference, summer time information, and an exclusive economic zone flag corresponding to section setting value, and sets a standard radio wave to be received (step S103a).

According to the acquired exclusive economic zone flag, the CPU 41 determines whether a section to which a current position belongs is in an exclusive economic zone (step S111). When it is determined that the section is not in the exclusive economic zone, that is, when an exclusive economic zone flag is "0" ("NO" in step S111), the CPU 41 makes the processing transition to step S104.

When it is determined that the section to which the current position belongs is in the exclusive economic zone, that is, when the exclusive economic zone flag is "1" ("YES" in step S111), the CPU 41 refers to a history of positioning and determines whether entrance from the outside of an exclusive economic zone of a current administrative unit into the exclusive economic zone is performed (step S112). More specifically, the CPU 41 refers to a recent history of when the exclusive economic zone flag is "0." When a time difference, a summer time information, or a section setting value related to the history is different from a value acquired in the processing in step S103a, it is determined that entrance into the EEZ is performed from the ocean in the outside of the EEZ of the administrative unit to which the current position belongs. When it is determined that entrance is not performed from the outside of the EEZ ("NO" in step S112), the CPU 41 makes the processing transition to step S104. That is, the time difference and summer time information, which are acquired in step S103a, in the time zone in which the EEZ is considered are used as they are.

When it is determined that entrance is from the ocean outside of the exclusive economic zone ("YES" in step S112), the CPU 41 keeps using a time difference and summer time information which are currently used. Note that in a case where such setting is already updated in the processing in step S103a, a time difference and summer time information corresponding to the nearest point where the exclusive economic zone flag is "0" are acquired (step S113). Then, the CPU 41 makes the processing transition to step S104.

Note that when EEZs of different administrative units are adjacent to each other and a ship sails from a port in one administrative unit does not go out of an EEZ thereof and directly enters an EEZ of a different administrative unit, a section setting value of when the EEZ of the different administrative unit is assumed as high seas becomes necessary. Thus, in a case of considering such a case, a section setting value of when an EEZ is not considered is stored and held separately.

As described above, the electronic clock 1 of the present embodiment includes a timer circuit 46 to count a current date and time, a GPS reception processing unit 55 to acquire a current position, and the CPU 41. The CPU 41 (determination unit) determines a time zone in which an acquired current position is included and calculates local time corresponding to a time difference of the determined time zone (local time acquisition unit). Then, in a case of determining a time zone, when a boundary line of a time zone is along a coastline, the CPU 41 changes a boundary line from the coastline to a side of the sea in a predetermined range and determines a time zone.

As a result, at a place near a seacoast, especially on a side of the sea (adjacent sea), it is possible to reduce cases where local time is calculated and displayed in a time zone on the side of the sea which is not preferable for a great number of users on a side of land. Thus, it becomes possible to improve user-friendliness of when local time is calculated and displayed at a place near a seacoast.

Also, a predetermined distance range from a coastline to a boundary line of a time zone is determined according to a range of a territorial sea of each country in the world. Thus, in the territorial sea, it is possible to calculate and display local time in a time zone determined by an administrative unit to which the territorial sea belongs. Thus, it is possible to prevent local time from being calculated and displayed in a time zone on the outside of a territorial sea in a case where a user who belongs to the administrative unit goes to an adjacent sea in the territorial sea from a side of land and to prevent a trouble or inconvenience from happening.

Also, in a case of determining a boundary of a time zone substantially along an outer edge of a territorial sea, a boundary line of the territorial sea is in a range of 12 nautical miles from any position in a seacoast and is often a smooth line even when the coastline has a complicated shape. Thus, setting of a boundary becomes easy. Moreover, on a side of high seas, setting of a time zone, which setting is not practically accurate, rarely causes a trouble to a user. Thus, it becomes possible to set a boundary line as a schematic line such as a straight line, a polygonal line, or a smooth line and it is not necessary to reflect a complicated boundary line. Thus, it becomes easy to perform setting of map data and to improve a compression efficiency of a map data file.

Also, a ROM 42 to store local time setting data in each section of a world separated in latitude/longitude directions on the two-dimensional map 422a is included. The CPU 41 determines, from local time setting data 422, a time zone in a current position with reference to a section setting value of a section in which the current position is included. Thus, a user can easily acquire a time difference or summer time information with reference to a section setting value corresponding to a current position based on latitude/longitude without performing troublesome processing.

Also, in the local time setting data 422, a summer time utilization rule comparison table 422d of each section is included and the CPU 41 adds a shift according to utilization of summer time into a time difference of a time zone when calculating local time. Thus, a user can easily acquire local time to which summer time seasonally used in the region is adequately reflected.

In the two-dimensional map 422a stored in the ROM 42, a different map data file is stored in each zone Z including a plurality of sections L based on latitude/longitude and is compressed and stored. Thus, a capacity occupied in the ROM 42 by a two-dimensional map 422a having a large total size can be decreased when the map is not used. Also, it is possible to perform decompression processing only of a map data file including a section to which a current position belongs based on latitude/longitude of the current position. Accordingly, it is possible to prevent an increase in a capacity of a memory (RAM 43) by reducing a size of a map to be decompressed and to reduce time or a load necessary for decompression of a large file.

Also, a standard radio wave reception unit 53 to receive a standard radio wave which is a radio wave in a long-wavelength band and which includes date and time information is included. The CPU 41 acquires date and time information from a received radio wave and corrects a date and time of the timer circuit 46 based on the acquired date and time information. In the local time setting data 422, a reception area setting value of a standard radio wave including each section in a reception area is included. In the electronic clock 1, a standard radio wave is received based on the reception area setting value during date and time correction. Thus, it is possible to acquire a current date and time easily with small power consumption by reducing a trouble of receiving and deciphering a standard radio wave which cannot be received or a reception state of which is not good or by reducing time and effort to perform detection uselessly.

Also, by installing a program to cause a computer to execute processing according to such an embodiment of the invention into an electronic device including a timer circuit and a configuration to acquire a current position, it is possible to make counting and displaying of a date and time for various kinds of usage more convenient for a user.

Note that the present invention is not limited to the above-described embodiment and various changes can be made.

For example, in the above-described embodiment, correction of date and time information is performed by using both of radio wave reception from a GPS satellite and reception of a standard radio wave. However, the date and time information may be acquired by a different method. For example, the date and time information may be acquired from a mobile phone or a smartphone by using proximity wireless communication. Also, in this case, information related to a reception area of a standard radio wave is not necessary.

Also, in the above-described embodiment, a radio wave from a positioning satellite is received to calculate a current position. However, a different method may be used. For example, current positional information may be acquired from a mobile phone or a smartphone by using proximity wireless communication.

Also, according to operation setting by a user or the like, a summer time display may not be performed and only a standard time of a time zone to which a section including a current position belongs may be counted and displayed.

Also, in the above-described embodiment, the two-dimensional map 422a is separated into a plurality of files in each zone and compression of data is performed in each mesh by using run-length compression. However, this is not the limitation. Data compression may be performed in one file as long as necessary information can be extracted immediately and a size of a decompressed compression file is not too large. Also, different algorithm may be used as a compression method of data.

Also, in the above-described embodiment, a time difference or summer time information of a section is acquired after the section to which a current position belongs is identified by using the two-dimensional map 422a. However, division into sections may not be performed and a time difference or summer time information may be acquired by direct comparison between a current position and a region in each time zone or a region where a summer time utilization rule is set.

Also as a data setting method in the local time setting data 422, various methods can be used. For example, one byte data is determined with respect to each of a time zone, a summer time utilization rule, and a standard radio wave reception area and a combination thereof is set as one byte data as a whole. However, a time zone, a summer time utilization rule, and a standard radio wave reception area corresponding to one byte of a section setting value may be set from the beginning. Also, data lengths (number of bytes/number of bits) may be different from each other. Moreover, a different parameter may be stored together.

Also, in the above-described embodiment, a description has been made with an example of an analog electronic clock using an indicator. However, an electronic clock to which an embodiment of the present invention can be applied is not limited to this and may be an electronic clock to perform a digital display or an electronic clock in which both of a digital display and an analog display are used.

Also, in the above-described embodiment, a description has been made with an example of the electronic clock 1 which is an electronic device. However, an embodiment of the present invention can be also applied to a different electronic device which counts a date and time and which can acquire current positional information. For example, in an electronic device such as a digital camera or a digital video camera, local time according to an embodiment of the present invention can be used for setting of a shooting date and time.

Also, in the above-described embodiment, an example in which the ROM 42 is used as a computer-readable medium of the program 421 according to an embodiment of the present invention has been described. However, this is not the limitation. As a different computer-readable medium, a portable recording medium such as a flash memory, a solid state drive (SSD), a different non-volatile memory, or a CD-ROM can be used. Also, as a medium to provide data of a program related to an embodiment of the present invention through a communication line, a carrier wave is also applied to an embodiment of the present invention.

Also, a detail such as a detail configuration or contents or a procedure of processing described in the above-described embodiment can be arbitrarily changed within the spirit and the scope of the present invention.

Some embodiments of the present invention have been described. However, the scope of the present invention is not limited to the above-described embodiments and includes a scope of the invention described in claims and an equivalent scope thereof.

The invention claimed is:

1. An electronic timepiece comprising:
   a counter that counts a current date and time;
   a UHF band receiver that receives satellite waves in the UHF band and computes a current position;
   a long wavelength band (LF band) receiver that receives an LF band radio signal, the LF band radio signal including date and time information;
   a memory that stores (i) a compressed map file containing area information regarding a plurality of divided predetermined sections of the world, and (ii) a frequency data table that stores data regarding frequencies which are receivable by the LF band receiver; and
   a processor that is configured to identify a time zone and calculate a local time, based on the current position, to acquire the date and time information from the LF band radio wave received by the LF band receiver, and to adjust the current date and time which is counted by the counter;
   wherein the processor is configured to execute a stored program to perform functions comprising:
      selecting area information from among the area information contained in the compressed map file, and decompressing the selected area information;

extracting a boundary line for identifying the time zone from the decompressed selected area information;

moving the boundary line by a non-zero interval of a predetermined distance away from land in a direction towards an adjacent sea, and identifying the time zone with the boundary line having been moved, when the boundary line is along a coastline; and identifying the time zone without moving the boundary line when the boundary line is not along a coastline.

2. The electronic timepiece according to claim 1, wherein one or more of the predetermined sections, in combination, form an administrative unit, and wherein the predetermined distance is determined according to a range of a territorial sea of a respective administrative unit to which the coastline belongs, from among a plurality of ranges of territorial seas stored for each administrative unit in the world.

3. The electronic timepiece according to claim 1, wherein the memory further stores a plurality of data tables for adjusting the current date and time which is counted by the counter based on the current position which is computed by the UHF band receiver, and wherein the processor is configured to identify the time zone of the current position based on data stored in the data tables and the current position.

4. The electronic timepiece according to claim 2, wherein the memory further stores a plurality of data tables for adjusting the current date and time which is counted by the counter based on the current position which is computed by the UHF band receiver, and wherein the processor is configured to identify the time zone of the current position based on data stored in the data tables and the current position.

5. The electronic timepiece according to claim 3, wherein the memory stores a daylight-saving time utilization data table, and wherein the processor is configured to calculate the local time so as to include, in a time difference of the identified time zone, a shift based on utilization of daylight-saving time.

6. The electronic timepiece according to claim 4, wherein the memory stores a daylight-saving time utilization data table, and wherein the processor is configured to calculate the local time so as to include, in a time difference of the identified time zone, a shift based on utilization of daylight-saving time.

7. The electronic timepiece according to claim 3, wherein the memory further stores information regarding a plurality of regions, each region including one or more of the predetermined sections, and wherein the processor selects a specific region from among the plurality of regions based on the current position which is computed by the UHF band receiver, and finds the local time setting information for the specific region.

8. The electronic timepiece according to claim 4, wherein the memory further stores information regarding a plurality of regions, each region including one or more of the predetermined sections, and wherein the processor selects a specific region from among the plurality of regions based on the current position which is computed by the UHF band receiver, and finds the local time setting information for the specific region.

9. The electronic timepiece according to claim 5, wherein the memory further stores information regarding a plurality of regions, each region including one or more of the predetermined sections, and wherein the processor selects a specific region from among the plurality of regions based on the current position which is computed by the UHF band receiver, and finds the local time setting information for the specific region.

10. The electronic timepiece according to claim 6, wherein the memory further stores information regarding a plurality of regions, each region including one or more of the predetermined sections, and wherein the processor selects a specific region from among the plurality of regions based on the current position which is computed by the UHF band receiver, and finds the local time setting information for the specific region.

11. A date and time setting method of an electronic timepiece, the electronic timepiece including a counter that counts a current date and time, a UHF band receiver that receives satellite waves in the UFH band and computes a current position, a long wavelength band (LF band) receiver that receives an LF band radio signal, the LF band radio signal including date and time information, a memory that stores (i) a compressed map file containing area information regarding a plurality of divided predetermined sections of the world and (ii) a frequency data table that stores data regarding frequencies which are receivable by the LF band receiver, and a processor that is configured to acquire the date and time information from the LF band radio wave receiver and to adjust the current date and time which is counted by the counter, and the method comprising steps of:

selecting area information from among the area information contained in the compressed map file;

decompressing the selected area information;

extracting a boundary line from the decompressed selected area information;

moving the boundary line by a non-zero interval of a predetermined distance away from land in a direction towards an adjacent sea, and identifying a time zone based on the current position with the boundary line having been moved, when the boundary line is along a coastline;

identifying the time zone based on the current position without moving the boundary line, when the boundary line is not along a coastline; and calculating a local time based on the identified time zone.

12. A non-transitory computer-readable storage medium that stores instructions executable by a processor communicating with a counter that counts a current date and time, a UHF band receiver that receives satellite waves in the UHF band and computes a current position, a long wavelength band (LF band) receiver that receives an LF band radio signal, the LF band radio signal including date and time information, and a memory that stores (i) a compressed map file containing area information regarding a plurality of divided predetermined sections of the world and (ii) a frequency data table that stores data regarding frequencies which are receivable by the LF band receiver, the processor being configured to acquire the date and time information from the LF band radio wave received by the LF band receiver, and to adjust the current date and time which is counted by the counter, and said instructions being executable to control the processor to perform functions comprising:

selecting area information from among the area information contained in the compressed map file;
decompressing the selected area information;
extracting a boundary line from the decompressed selected area information;
moving the boundary line by a non-zero interval of a predetermined distance away from land in a direction towards an adjacent sea, and identifying a time zone based on the current position with the boundary line having been moved, when the boundary line is along a coastline;
identifying the time zone based on the current position without moving the boundary line, when the boundary line is not along a coastline; and
calculating a local time based on the identified time zone.

* * * * *

UNITED STATES PATENT AND TRADEMARK OFFICE
CERTIFICATE OF CORRECTION

PATENT NO. : 9,756,463 B2
APPLICATION NO. : 14/795701
DATED : September 5, 2017
INVENTOR(S) : Masao Sambongi et al.

It is certified that error appears in the above-identified patent and that said Letters Patent is hereby corrected as shown below:

Column 18, Line 22, delete "UFH" and insert --UHF--.

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*